United States Patent [19]

Kawabe et al.

[11] Patent Number: 4,937,969
[45] Date of Patent: Jul. 3, 1990

[54] HYDROPONIC SYSTEM

[75] Inventors: Hidehiko Kawabe, Yawata; Toshikazu Tomioka, Ibaraki, both of Japan

[73] Assignee: Matsushita Electric Industrial Co., Ltd., Kadoma, Japan

[21] Appl. No.: 280,468

[22] Filed: Dec. 6, 1988

[30] Foreign Application Priority Data

Dec. 7, 1987 [JP] Japan .................................. 62-309025
Dec. 7, 1987 [JP] Japan .................................. 62-309026
Dec. 7, 1987 [JP] Japan .................................. 62-309027

[51] Int. Cl.$^5$ .......................... A01G 13/04; A45F 1/6
[52] U.S. Cl. ......................................... 47/17; 135/94
[58] Field of Search ....................... 47/17; 135/93, 94

[56] References Cited

U.S. PATENT DOCUMENTS

| | | | |
|---|---|---|---|
| 1,022,948 | 4/1912 | Jacobs | 47/17 |
| 1,912,209 | 5/1933 | Lassen et al. | 47/17 |
| 3,165,110 | 1/1965 | Brooks | 47/17 |
| 3,874,144 | 4/1975 | Rowell | 47/17 |
| 4,486,977 | 12/1984 | Edgecombe et al. | |
| 4,493,163 | 1/1985 | De Monbrison | |
| 4,584,791 | 4/1986 | Wolf | |
| 4,603,506 | 8/1986 | Powell, Jr. | |

Primary Examiner—John E. Murtagh
Assistant Examiner—Michele A. Van Patten
Attorney, Agent, or Firm—Cushman, Darby & Cushman

[57] ABSTRACT

Two pipe-construction houses of a shed-roofed type, facing each other at their ridge sides with a gap provided between the ridges, are coupled with girders to make an integrated construction. The sides are covered with rollable ventilative sheets, and its roof is made of a soft plastic film span on a pipe-construction roof frame above a hard plastic sheet spread along the central part in the longitudinal direction of the roof. Cultivation beds of rust-prevention-coated thin steel sheet are hung on bed bearing fittings of a pipe structure. Nutrient solution is fed by an air lift pump under control by electric conductance thereof.

11 Claims, 8 Drawing Sheets

HYDROPONIC SYSTEM

FIELD OF THE INVENTION AND RELATED ART STATEMENT

1. Field of the Invention

The present invention relates to a hydroponic system and particularly pertains to Hydroponic equipment and a house construction for such hydroponic equipment.

2. Description of the Related Art

Although numerous patents and literatures, regarding hydroponic equipment have been well known in the past, there is available no example of systems intended for hydroponic cultivation which are usable, for example, in tropic, subtropic zones, etc., which have no heat insulating function, which permit easy maintenance and which require only low construction cost.

OBJECT AND SUMMARY OF THE INVENTION

The present invention has as its object providing a hydroponic system which may be exercised in regions where the ambient temperature is around the upper limit for the suitable temperature for cultivation throughout the cultivation period.

Thus according to this invention, a construction which permits introduction of ambient atmosphere into the environment for cultivation is provided by making each house roof with transparent sheets which shield it from ultraviolet rays and by installing two houses of shed-roofed structure, wherein ridge sides of each shed roof are disposed to face each other with a gap provided between these ridges, thereby making it possible to prevent rain from directly falling on the crops being cultivated and also to keep the temperature of the enviroment inside the house under the upper limit for appropriate cultivation temperature by introduction of outside air thereinto, even when it is under influence of sunshine. Further, by partially spreading a hard plastic sheet or plate below a roof coating member of the transparent sheet, to be fixed in place, the roof coating member may be fixed with a suitable tension with a simple means, or by employing a structure such that cultivating equipment such as cultivation beds, etc., may be readily erected on site, or further, by implementing automation means to control the nutrient solution concentration, etc., enormous advantages will be derived in reduced maintenance care and construction cost.

As will be indicated by the preferred embodiments, the hydroponic house construction is a construction not only capable of minimizing the temperature rise inside the houses, but is sturdy enough to bear strong wind, because favorable ventilation inside the houses is assured without employing such power as blowers', when it is used in regions where high temperature prevails, like in tropic or subtropic zones. Besides, since a hard plastic sheet is fixed on top of the structural members which form the roof in the longitudinal direction along the center of the roof part whereon a soft plastic sheet is spread and tension is applied thereon by thread, even though the structural members composing the roof surface are a straight shape, the soft film can be adequately fixed, enabling a low priced soft film, which is easily mountable and dismountable, to be used as a roofing material. And since the structural members composing the roof surface are allowed to be straight in shape, this system is highly advantageous in both aspects of forming and transporting costs. Moreover, by adopting a hanging structure for the whole of the cultivation beds, not only relief on the initial investment on account of cutback on the cost of members and on the improvement in their transport are achieved but ease of work execution resulting from erection of the facility in erection, simplification of level correction, and ease of heat insulating are provided.

Furthermore, this system is equipped with a nutrient solution controller having a timer which operates for a reset length of time at plural numbers a preset time and is combined with an EC meter. On this account, improvement in cultivation reliability may be expected since excessive top dressing due to failure of equipment is preventable, with the maximum top dressing being specified by the controller. Besides, it is possible to independently control nutrient solutions for cultivation of a plurality of systems with a single EC meter by installing a successively switching relay circuit. Hence, the cost of the initial investment is reduced. Further, initial investment cutdown on component devices is expectable by using a tube pump which permits an equal amount of two fluids to be simultaneously discharged by use of a low priced induction motor having a large output capacity instead of making use of two units of conventional expensive fixed displacement pumps. The top dressing amount may then be controllable by the top dressing time integrated value measured with an hour meter connected in parallel with each pump and other advantages will be derived. Thus this invention's effects on practical applications are enormous.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
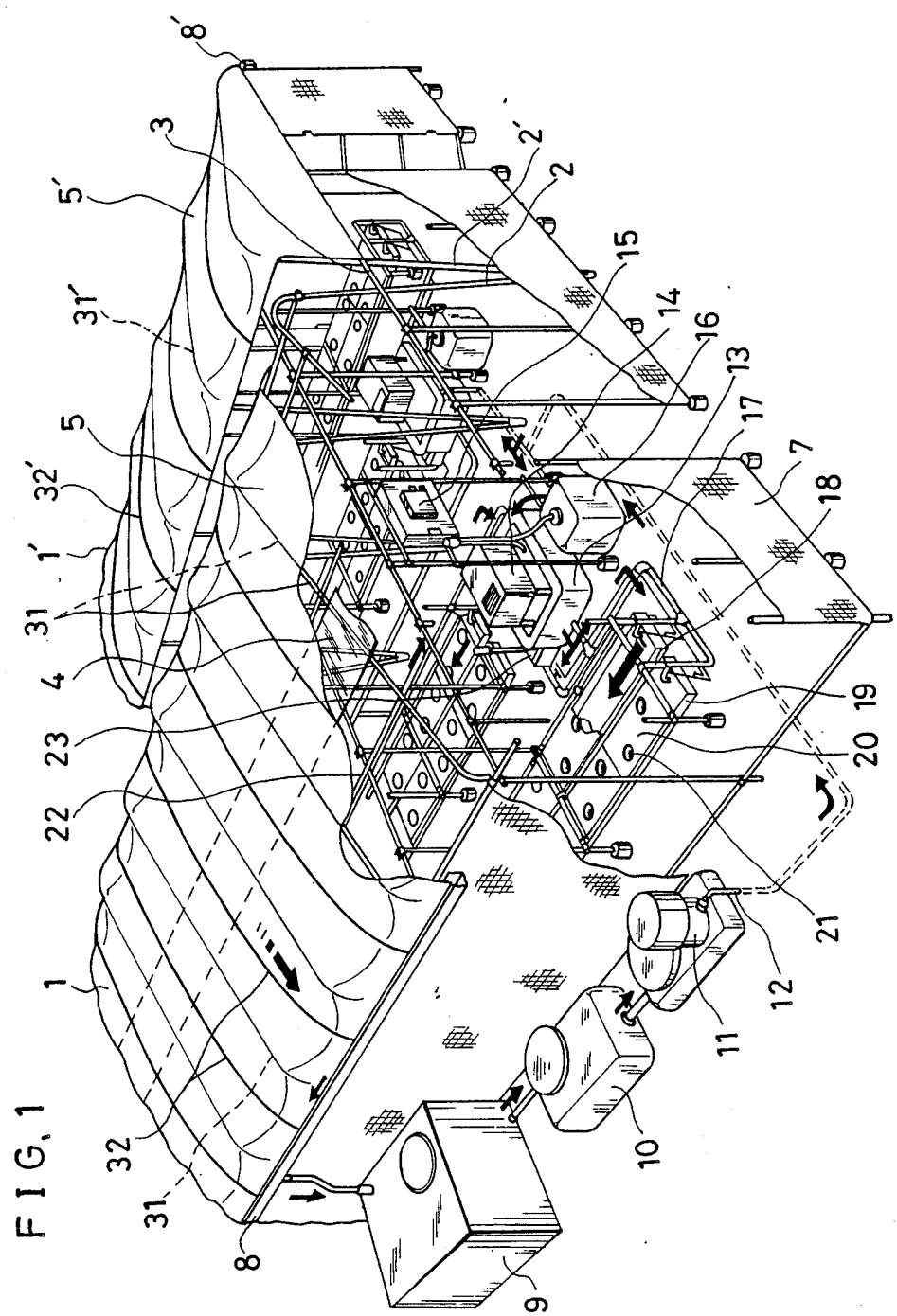
FIG. 1 is a perspective view for explanation of a hydroponic house construction with the features embodying the present invention.

The preferred construction not only ensures ventilation inside the houses, but withstands strong wind, solves problems on cultivation environment as in tropic zones, etc. This system comprises two houses of shed-roofed structure, facing each other at their ridge sides, with a gap provided between the ridges. The two houses of the aforementioned structure are coupled with girders or substantially horizontal connection means to make an integrated construction, with its sides covered with rolled ventilative sheets. With this construction, wind entering through the sides easily passes through the houses to their ridge sides; and even in a windless state, the air with its temperature raised inside the houses will be discharged out of the houses through the ridge side gap by going up inside the houses. And even when the houses happen to be exposed to strong wind, it is only the roof surface that will receive direct effect of the wind pressure; the wind pressure on the sides may be notably reducible.

At the roof part, on top of a hard plastic sheet spread along its central part in the longitudinal direction, a soft plastic sheet is spread. The roof part is composed such that at positions distanced from the structural members, a tension is applied with threads from its ridge to eaves, thereby making it possible to securely set the soft plastic sheet so as to be withstand strong wind, even if the structural members composing the roof surface are in a straight line shape at the house cross-section.

And because a triangle is built up at the house cross-section between each pillar on the house ridge side and girder, this construction can lend itself to improvement in strength.

Bed bearing fittings are hung at intervals with pipe assembly members between two pipe members installed horizontally by means of house struts, etc., and on these bed fittings cultivation beds are mounted. This cultivation bed is formed of a thin sheet of rust-resistive material into a structure which has a reasonable strength and is adaptable for piling one upon another for facility in transportation of a large number of sheets, yet is adapted to a hanging structure for the cultivation bed. Accordingly, its bottom and edge parts may be held by the bed bearing fittings, so that it becomes possible to form the cultivation bed with a thin sheet, thereby reducing costs. An assembling structure may be adopted with some gradient provided for the side surfaces, so that a plurality of cultivation beds may be piled one upon another for transportation, which will lead to curtailment in transportation expense.

Further, the present invention provides: a hydroponic nutrient solution concentration controller equipped with an electric conductance (hereinafter abbreviated to EC) meter which takes a measurement of the EC value of a hydroponic nutrient solution and delivers a output when the measured value is lower than a preset value; a timer which closes its contact for a preset time period at preset plural times of a day; a two-channel tube pump which is driven by a plural number of EC sensors and a plural number of induction motors; hour meters connected in parallel with the aforementioned induction motors; a plurality of EC sensors; relay circuits whose operation is triggered by the aforementioned timer contact operation which effects successive switching of a plural number of circuits for the input to and output from said induction motors, and delaying circuits for delaying the output after the successive switching.

According to this invention, due to the structure above-mentioned, an output will be delivered from the EC meter when the EC value lowers below the preset value. At a preset point of time, the timer contact will be closed for and kept closed for the specified length of time. Then, the output will be transmitted to the induction motor through a delay circuit, thereby causing the tube pump to be driven. By use of the successively switching relay circuits inserted between the timer and the induction motor, the above-mentioned operation will be successively repeated for a plurality of systems of hydroponic channels.

FIRST EMBODIMENT

A hydroponic house construction with the features embodying this invention is shown in FIG. 1. Structures 1 and 1' are formed of a construction of two houses with their ridge sides faced to each other and a gap provided therebetween. The foundation for pillars 2, 2' on the ridge sides of the aforementioned structures 1 and 1' are provided in common thereto, the pillars being fixed in the foundation and widening upward in the distance therebetween. The structures 1, 1' are formed as an integral construction by coupling them with girders 3. On top of the roof structure such as libs 31, 31' of each of the structures 1, 1', a transparent sheet 4 such as a transparent hard plastic film is fixed along the center in a longitudinal direction. On top of this sheet, a soft plastic sheet 5, 5' is spread and a tension is applied with threads 32, 32' spanned from the ridge to the eaves at positions between the roof structural members, to firmly set the soft plastic sheet 5, 5'. In regions like tropic or subtropic zones where ultraviolet rays abound, materials like PVC, etc., having characteristics of shielding and reducing ultraviolet wave lengths shorter than 390 nanometers should be preferable for the soft plastic sheet 5, 5' to be spread on the roof surface. Side walls of the house construction are covered with such a ventilative material 7 as wind shield net, cheesecloth, etc. The ventilative sheet should be provided in a rollable state.

The rain water which has fallen on the roof surface is caught by eave gutters 8, 8', and is led into a water storage tank 9 wherein the organic component contained dissolved therein is removed by means of a water purifier 10. Thereafter, the purified water is fed by a water pump 11 to a nutrient solution tank 13 through a feed pipe 12, so as to be utilized as irrigation water for hydroponic cultivation. In the nutrient solution tank 13, the temperature of the nutrient solution is controlled with regard to its temperature by the nutrient solution cooler 14, and with regard to its nutrient solution concentration by the operation of the nutrient solution concentration controller 15 which automatically supplies fertilizer from a fertilizer tank 16. Then, after passing a solution supply pipe 17, the nutrient solution is fed into a cultivation bed 19 by the action of a water lifter 18 which lifts the nutrient solution by air lift action. The air lift action lifts the solution by means of the upwards motion of air bubbles in the aqueous solution. Numeral 20 designates a bed cover made of a heat insulating material, and 21 a cultivation pot to be filled with gravels for fixing the root of a plant. The nutrient solution which has been used to give nutrient to plants at the cultivation bed 19 again refluxes to the nutrient solution tank 13 through a reflux pipe 22. Numeral 23 denotes an air pump for feeding air to the water lifter 18.

SECOND EMBODIMENT

Figure 2:
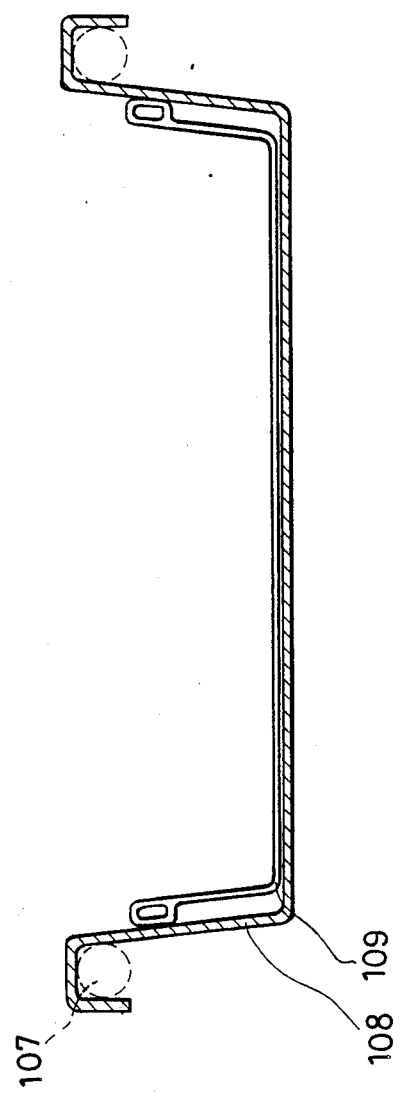
FIG. 2 is a sectional view of a cultivation bed in a hydroponic equipment with the features embodying the present invention.
Figure 3:
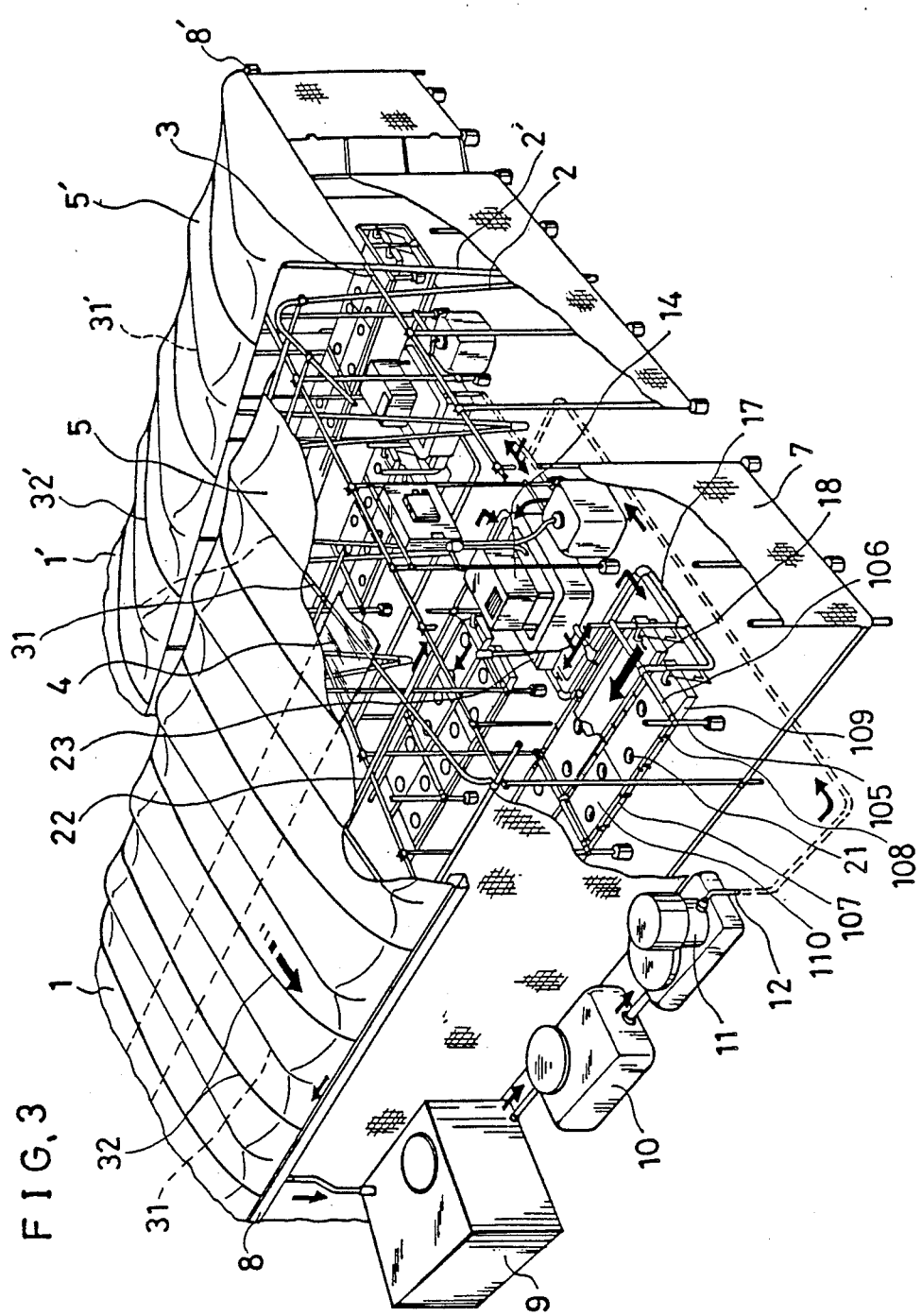
FIG. 3 is a perspective view of a hydroponic equipment with the features embodying this invention.

FIG. 3 is a perspective view of hydroponic equipment with the features embodying this invention, and FIG. 2 is a cross-sectional view of a cultivation bed of the hydroponic equipment with the features embodying this invention. Corresponding parts and components to the first embodiment are shown by the same numerals and marks, and the description thereon made in the first embodiment similarly applies. Differences and features of this second embodiment from the first embodiment are as follows. Referring to FIG. 2 and FIG. 3, numeral 105 designates cultivation bed struts which also serve as house struts. Numeral 106 designates bed beams bound by pipe fixtures to the aforementioned struts 105. Numeral 107 designates supporting pipes bound to the aforementioned bed beams 106 with pipe fixtures. Numeral 108 designates bed bearing fittings. Numeral 109 desingates cultivation beds. And numeral 110 designates bed covers.

Since the cultivation bed 109 is supported at its sides and bottom by bed bearing fittings 108 hung at intervals of approximately 60 cm from two supporting pipes 107 placed at a distance of approximately 40 cm from each other, the collapse of its sides is prevented even though it is formed of a thin sheet. In this embodiment, use was made of steel sheet of a width of 36 cm which is subjected to a surface treatment, and then, coated on both sides thereof with a hard vinyl chloride resin for rust prevention. The cultivation bed's measure was set to 4 m, plural cultivation beds are coupled with joint members therebetween and with stop members at both ends of the connection.

Then the cultivation bed configurated in the aforementioned manner is filled with water, and the levelings of the cultivation bed are checked. The leveling was rectified by releasing the pipe fixtures one by one.

Since the aforementioned cultivation bed is made with a thin sheet in an inverted trapezoid shape, the beds may be stacked one upon another when transporting them, and thereby are easily transported in a small space.

As hereabove described, according to this invention, by forming the whole of the cultivation beds into a hanging construction, the beds can be made using thin sheets, thereby cutting costs and facilitating the of transportation of the members.

Further, by applying a heat insulative material, for instance by spraying, on the back of the cultivation bed bottom where the heat radiation was largest, its heat insulation has been improved.

THIRD EMBODIMENT

Figure 4:
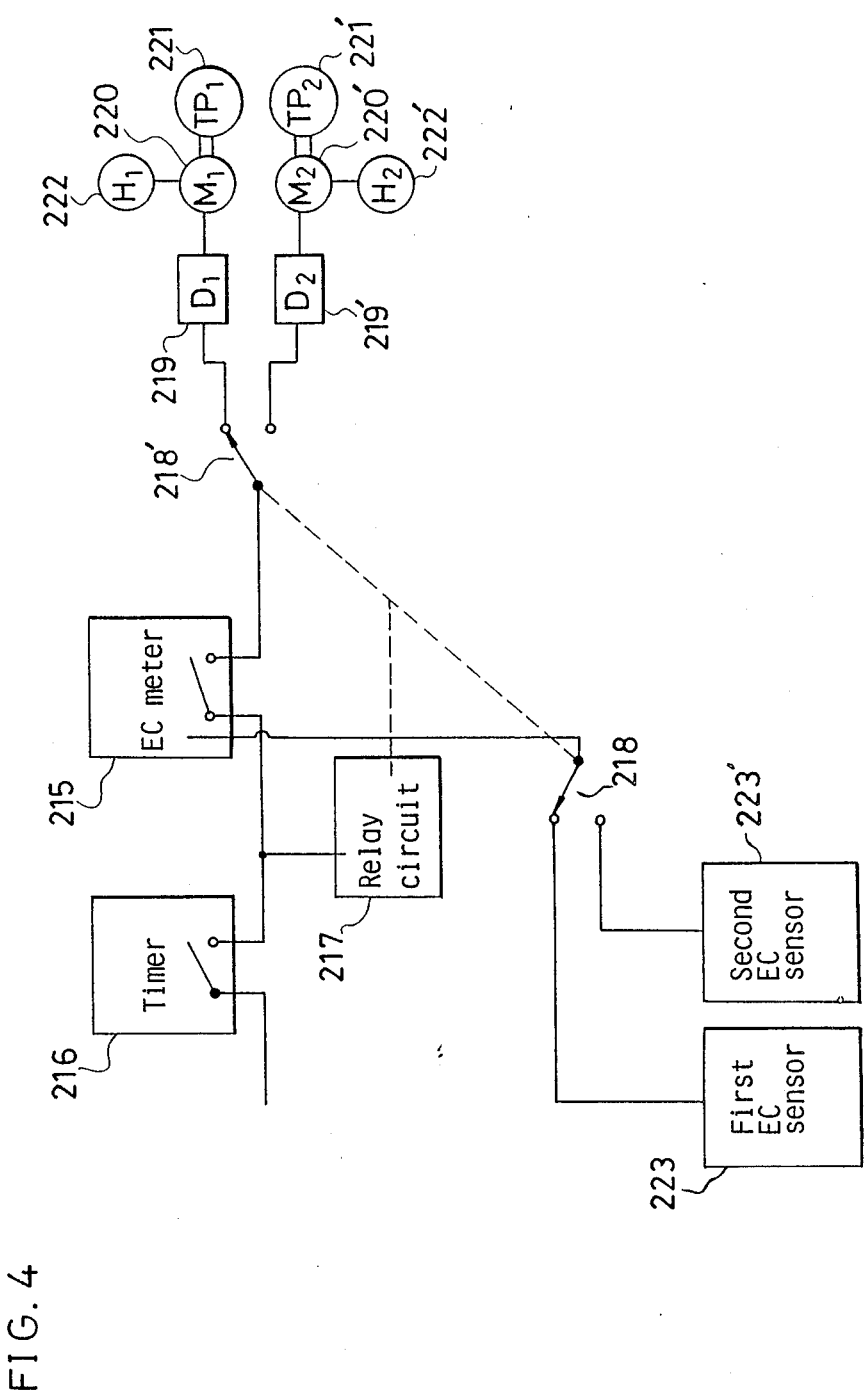
FIG. 4 is a circuit diagram of a nutrient solution controller of this invention.
Figure 5:
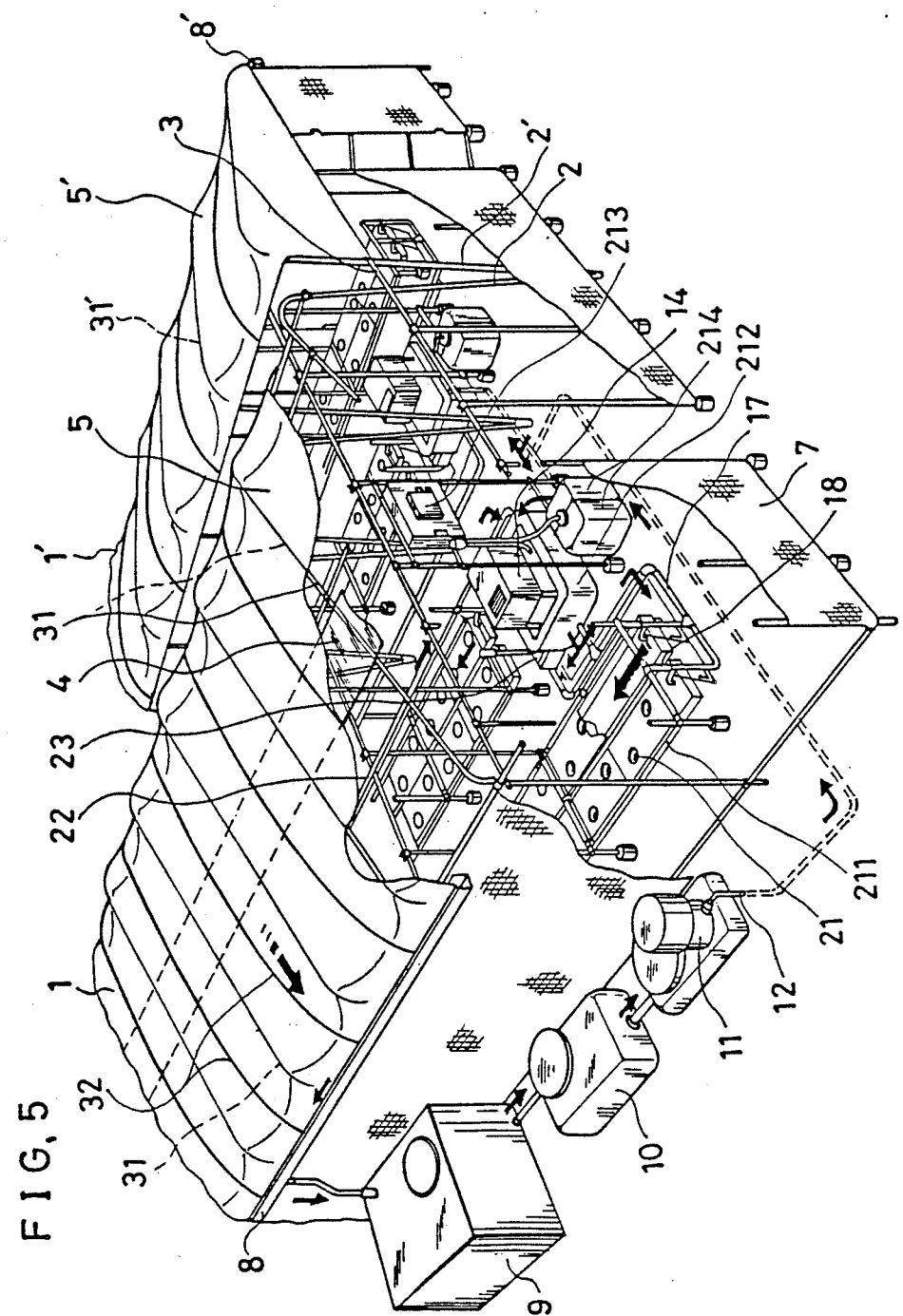
FIG. 5 is a perspective view of a hydroponic equipment with the features embodying this invention.
Figure 6A:
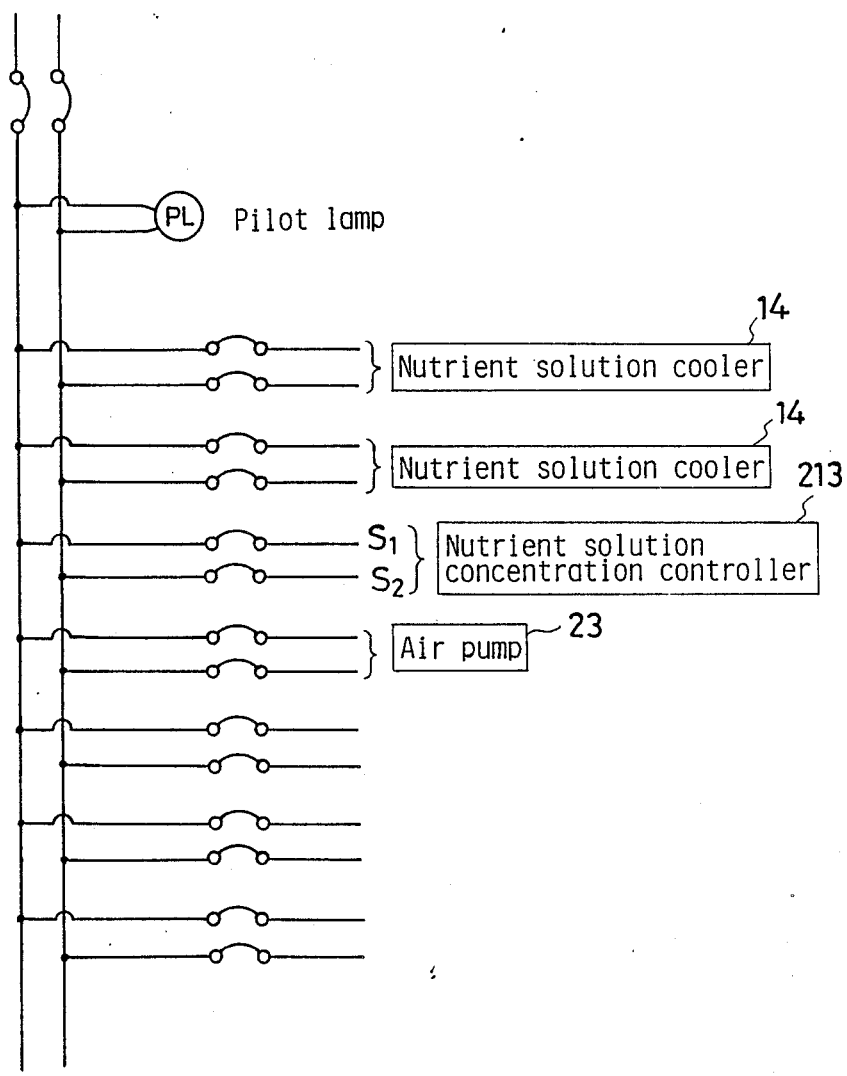
FIG. 6 is a particular circuit diagram of a nutrient solution controller of this invention.
Figure 6B:
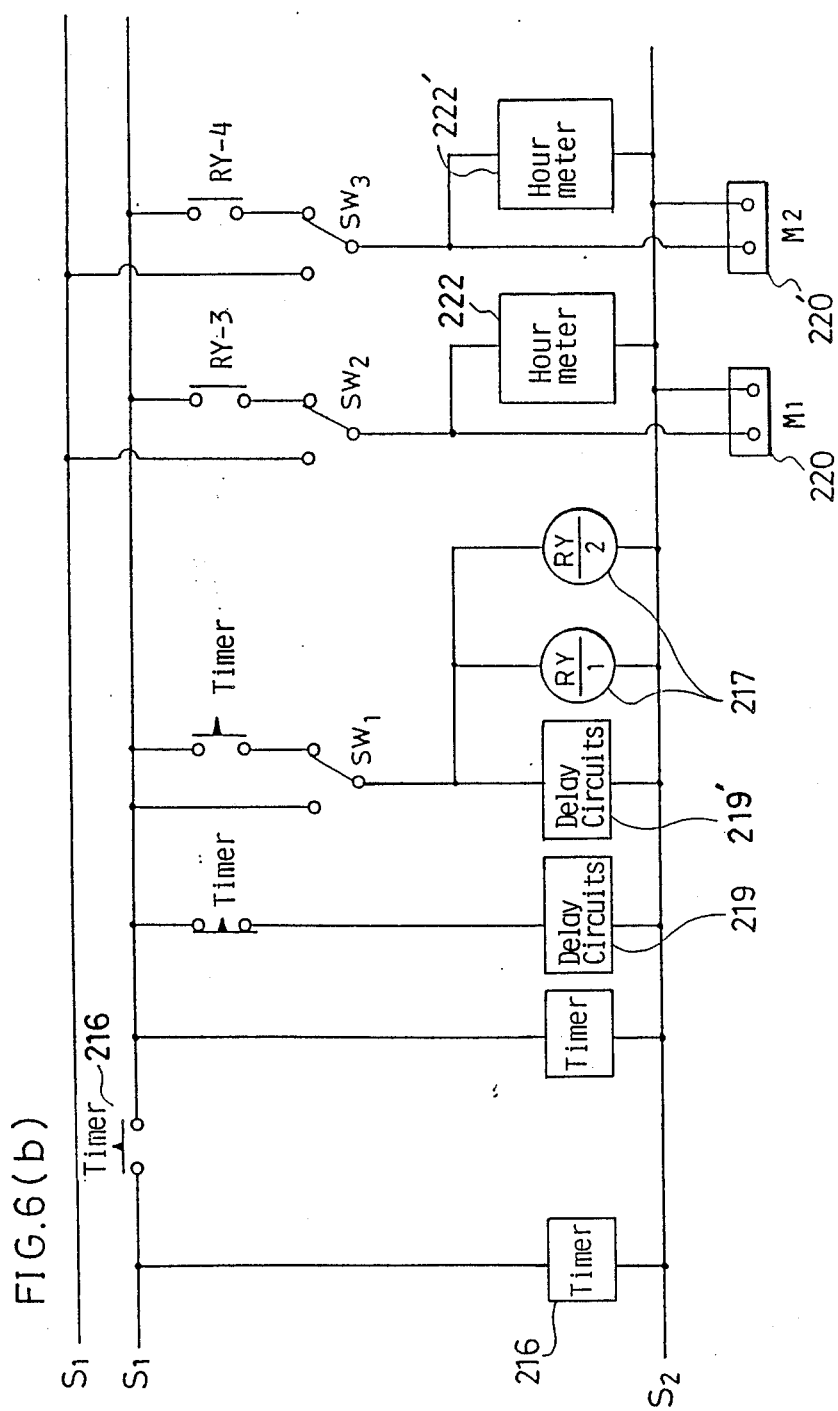
Figure 6C:
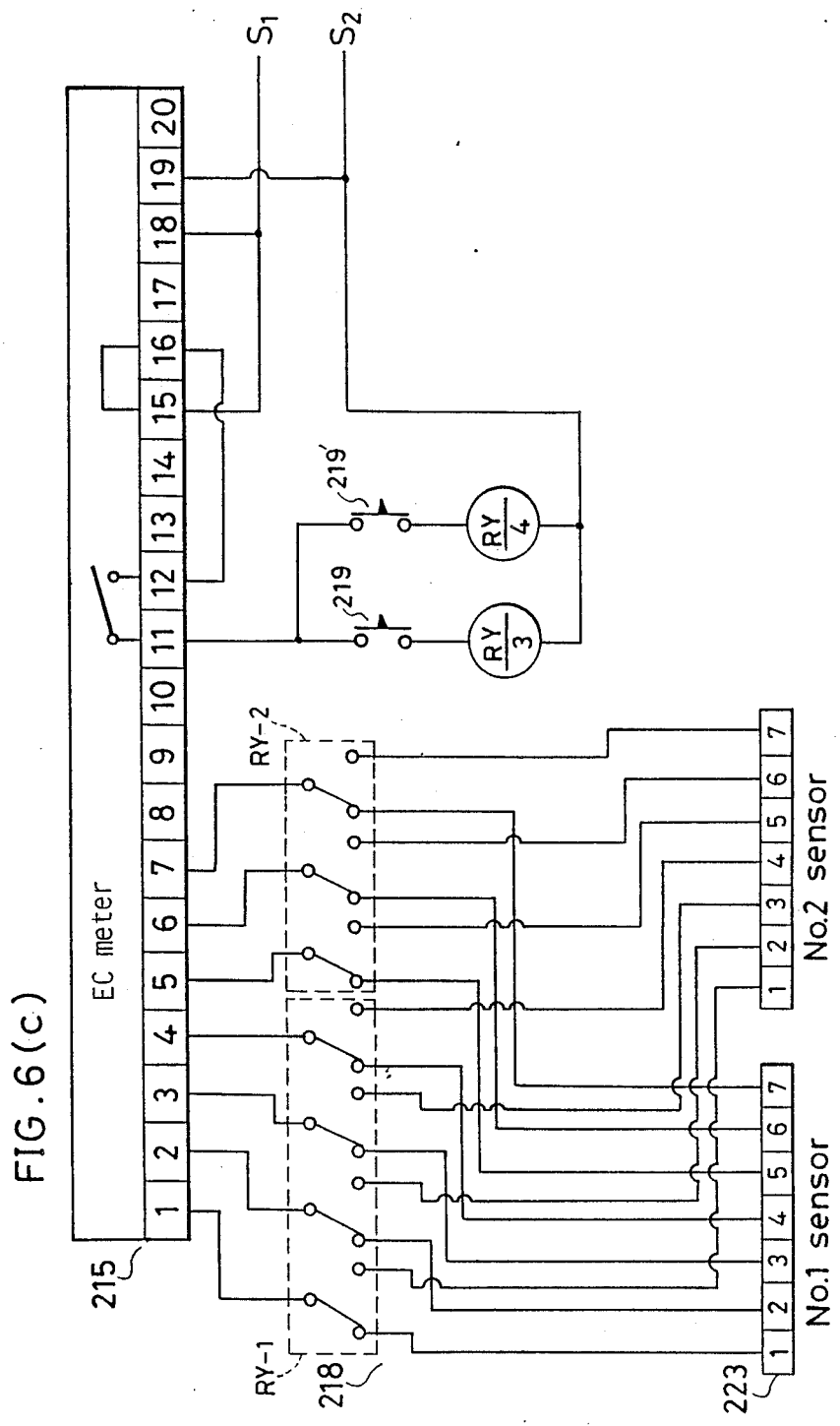

FIG. 5 shows a perspective view of a hydroponic system with the features embodying this invention. Corresponding parts and components to the first embodiment are shown by the same numerals and marks, and the description thereon made in the first embodiment similarly applies. Differences and features of this third embodiment from the first embodiment are as follows: Numeral 211 designates hydroponic beds. Numeral 212 designates an approximately 300 l nutrient solution tank. Numeral 213 designates a nutrient solution concentration controller. And numeral 214 designates a fertilizer tank. FIG. 4 is a circuit diagram of the nutrient solution controller, and FIG. 6 is a concrete circuit diagram of the same. In these figures, numeral 215 designates an EC meter. Numeral 216 designates a timer for setting the top dressing time period and times. Numerals 217, 218 and 218' designate two-system successive switching relay circuits whose operation is triggered by contact operation of the timer 16'. Numerals 219 and 219' denote delay circuits capable of delaying up to 30 secs. Numerals 220, 220' and 221, 221' indicate 10W induction motors and 4 mm and two channel tube pumps which are to be driven thereby, respectively. Numerals 222, 222' designate hour meters which give their indication on the basis of a minimum time length of 0.1 min. Numerals 223 and 223' designate a first EC sensor and a second EC sensor. Actual circuits are as given in FIG. 6.

In the following, the operation of hydroponic equipment with the features embodying this invention is described:

As the EC value in a nutrient solution tank becomes lowered due to the fertilizer absorption by cultivated crops, etc., the EC value will be detected by a first EC sensor 223. And when this value goes down below a preset value, the relay contacts will be closed. On the other hand, the timer 216 will close its contact at the preset time for the preset length of time. The successive switching relay circuit 217 effects a change-over between contacts 218 for the first EC sensor 223 and the second EC sensor 223', and also contacts 218' for changing-over the output circuits $D_{1P}$, $D_2$ of a plurality of systems while the aforementioned timer contact is closed. When the timer 216 is closed and the successive switching relay contacts 218 and 218' are closed at their first position, an induction motor 220 or 220' is run with a delay of a definite time due to the delay circuit 219, to drive a tube pump. Thereby, an equal amount of each of the two types of fertilizer in the fertilizer tank is pumped up, to be fed into the nutrient solution tank. This operation is continued, until the EC value reaches the preset value or the successive switching relay contact is closed at the second position. During this time period, the hour meter 222 or 222' is driven, to integrate and indicate the time during which the fertilizer has been supplied.

As hereabove described, according to the embodiment of this invention, because crops being cultivated of two systems are simultaneously controlled, the time length for maximum top dressing or the maximum top dressing rate will be determined by adjusting the preset time length and the number of setting times. Therefore, prevention of excessive top dressing to cultivated crops is possible, even if the EC meter makes erroneous operation due to defective EC sensors, etc. Further, by increasing the number of preset times, irregularity in the top dressing concentration may be reduced, thereby enabling an optimal rooting zone environment to be provided to the crops being cultivated. And, control of the top dressing amount becomes possible also by parallel installation of hour meters. On the other hand, in case of a fertilizer containing precipitative $Ca^{2+}$ salts and $PO_4^{3-}$ which requires equal amount of mixing of the two solutions, a low cost equal amount top dressing has become possible by coupling a two channel tube pump with one unit of an induction motor, in place of the conventional fixed displacement pumps using two units of synchronous motors. Besides, since the tube pump does not utilize any valve, etc., it is not likely to sustain such an abnormality as blockading by foreign matters in the fertilizer.

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed.

We claim:

1. A hydroponic system comprising:
   a pipe-assembly house construction defining an interior space comprising two shed-roofed structures including strut pipes and having ridge sides facing each other with a gap provided between the facing ridge sides and at least partially exposing the interior space, said two shed-roofed structures covered with ultraviolet shielding transparent sheets with the gap remaining uncovered, the two shed-roofed structures having a foundation and ridge-side pillars in common, said ridge-side pillars being fixed on said foundation and protruding from the foundation with the distance between adjacent ridge-side pillars expanding as the ridge-side pillars protrude away from the foundation, said two shed-roofed structures being coupled with girders to make an integrated construction thereby forming a triangular configuration between adjacent ridge-side pillar sides of said pipe-assembly house construction, the triangular configuration being covered with ventilative sheets, a plurality of rows of cultivation beds fixed on the strut pipes of said pipe-assembly house construction, nutrient solution channels connecting said cultivation beds, said cultivation beds arranged as a plurality of systems each having several rows of cultivation beds as a unit, nutrient solution tanks coupled to respective systems containing nutrient solution to be provided to the cultivation bends through the channels, the nutrient solution characterized by a temperature and a concentration, and nutrient solution controllers for controlling the concentration and the temperature of the said nutrient solution channels.

2. The hydroponic system in accordance with claim 1 wherein each shed-roofed structure is characterized by a longitudinal direction and a center, each shed-roofed structure including eaves and having a hard transparent plastic sheet spread and fixed in the longitudinal direction along the center of the shed-roofed structure and under said ultraviolet shielding transparent plastic sheets, each shed-roofed structure further including tension threads spanned from the ridge to the eaves to secure the ultraviolet shield transparent sheet.

3. The hydroponic system in according with claim 2, further comprising an induction motor coupled with a tube pump connecting at least two nutrient solution channels.

4. A hydroponic system according to claim 2, wherein the shed-roofed structures include roof members supporting the ultraviolet shielding transparent sheets, the tension threads spanning from the ridges to the eaves of the shed-roofed structures between the roof members.

5. The hydroponic system in accordance with claim 1 comprising a hydroponic equipment wherein, on bed fittings of inverted trapezoidal shape hung at intervals between two pipe members horizontally installed on house struts by means of pipe assembly members, cultivation beds having a section in an inverted trapezoidal shape which is smaller than the bed fitting are mounted.

6. The hydroponic system in accordance with claim 5 comprising a hydroponic equipment in which the cultivation beds are formed of a steel sheet coated with hard vinyl chloride resin on both surface thereof and shaped in an inverted trapezoid to be stackable one upon another.

7. The hydroponic system in accordance with claim 5 wherein respective cultivation beds have predetermined measures, bed joints, bed end members and a drain hole member for inside bed nutrient solution.

8. The hydroponic system in accordance with claim 5 wherein the cultivatioon bed has heat insulation means put on the back of its bottom.

9. The hydroponic system in accordance with claim 1, further comprising said nutrient solution concentration controller an EC meter which closes its contact when the electric conductivity value is lower than the preset value, a timer which closes its contact for the preset length of time at preset times plural number of times a day and a fertilizer supplying equipment connected in series to said contacts to power a supply.

10. The hydroponic system in accordance with claim 9 further comprising a nutrient concentration controller wherein each of the output signals from respective EC sensors placed in plural number of nutrient solution tanks for controlling hydroponic channels of plural number of systems is inputted to an EC meter through successive plural number of change-over relays whose operation is triggered by said timer contact operation and said outputs from said EC meter and said timer are delivered to the fertilizer feeding equipment through one of the aforementioned successive switching relays and past a delay circuit for each system.

11. The hydroponic system according to claim 1, wherein said nutrient solution controllers each comprises an hour meter connected to an induction motor for feeding said nutrient solution.

* * * * *